United States Patent
Wright et al.

(10) Patent No.: US 6,901,073 B2
(45) Date of Patent: May 31, 2005

(54) ENCAPSULATION METHOD AND APPARATUS FOR COMMUNICATING FIXED-LENGTH DATA PACKETS THROUGH AN INTERMEDIATE NETWORK

(75) Inventors: David A. Wright, Hermosa Beach, CA (US); Michael W. Mann, Gilbert, AZ (US); Aaron D. Falk, Norwalk, CT (US); Rhon L. Williams, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 803 days.

(21) Appl. No.: 09/782,807

(22) Filed: Feb. 14, 2001

(65) Prior Publication Data

US 2003/0185215 A1 Oct. 2, 2003

(51) Int. Cl.[7] .............................................. H04L 12/56
(52) U.S. Cl. .............................. 370/395.5; 370/395.52; 370/395.6; 370/396; 370/399
(58) Field of Search ............................. 370/395.1, 396, 370/397, 398, 399, 395.3, 395.4, 395.5, 395.51, 395.52, 395.54, 395.56, 389, 235, 392, 230, 395.21, 395.32, 395.61, 395.7, 401, 466

(56) References Cited

U.S. PATENT DOCUMENTS

| | | | | |
|---|---|---|---|---|
| 5,119,369 A | * | 6/1992 | Tanabe et al. | 370/392 |
| 5,166,930 A | * | 11/1992 | Braff et al. | 370/235 |
| 5,790,541 A | * | 8/1998 | Patrick et al. | 370/392 |
| 6,151,318 A | * | 11/2000 | Woodward et al. | 370/392 |
| 6,151,319 A | * | 11/2000 | Dommety et al. | 370/395.52 |
| 6,259,699 B1 | * | 7/2001 | Opalka et al. | 370/398 |
| 6,266,324 B1 | * | 7/2001 | Kirino et al. | 370/230 |
| 6,526,056 B1 | * | 2/2003 | Rekhter et al. | 370/392 |
| 6,636,512 B1 | * | 10/2003 | Lorrain et al. | 370/392 |
| 6,636,516 B1 | * | 10/2003 | Yamano | 370/395.52 |
| 6,738,381 B1 | * | 5/2004 | Agnevik et al. | 370/395.7 |

* cited by examiner

*Primary Examiner*—Phirin Sam
*Assistant Examiner*—Anthony Ton

(57) ABSTRACT

A method and apparatus for communicating fixed-length data packets through an intermediate computer network. The method comprises receiving a data packet characterized by a fixed-length packet format, and constructing a remnant packet characterized by the fixed-length packet format, which includes inserting at least a portion of the data packet routing information in the data field of the remnant packet. The method also comprises communicating the remnant packet, receiving the remnant packet and constructing a reconstructed data packet, which includes Inserting data packet routing information obtained from the remnant packet in the address field of the reconstructed packet. The apparatus comprises a communication network node comprising a receiver, transmitter, computer memory and processor for performing the foregoing method steps.

24 Claims, 6 Drawing Sheets

ENCAPSULATION METHOD AND APPARATUS FOR COMMUNICATING FIXED-LENGTH DATA PACKETS THROUGH AN INTERMEDIATE NETWORK

BACKGROUND OF THE INVENTION

The present invention relates generally to computer network communications. More specifically, the present invention relates to a method and apparatus for communicating fixed-length data packets through an intermediate computer network.

Modern computer data communications take place over expansive computer networks that often include many intermediate networks or sub-networks. An intermediate network may have an internal routing or address scheme that is wholly or partially incompatible with the routing scheme used by other computer networks.

Computer networks typically communicate using data packets that are defined by a standard protocol. Modern protocols may define data packets to be of fixed length or variable length. Typically, a protocol will divide a data packet into address space and data space. The data space generally contains information to be communicated between network users, and the address space contains information relevant to routing the data packet between the network users. A fixed-length data packet typically includes a predetermined amount of address space and data space.

Some protocols, such as the Asynchronous Transfer Mode (ATM) protocol, allow the data packet routing information in the address space to be dynamically modified while the data packet is traversing a communication network. For example, when a communication network is routing an ATM data packet (or "cell") between network nodes using virtual channel (VC) switching, the network nodes may dynamically modify information in the virtual channel indicator (VCI) and virtual path indicator (VPI) fields of the ATM data packet. When a communication network is routing an ATM cell between network nodes using virtual path (VP) switching, the network nodes may dynamically modify information in the VPI field but not the VCI field.

An intermediate network may use a different data packet routing technique than external networks that are communicating data packets through the intermediate network. An intermediate network may have design constraints that limit the routing flexibility of the intermediate network and the adaptability of the intermediate network to an external data packet routing technique. For example, a satellite communication network may route data packets using a custom internal routing technique that is designed to minimize the amount of memory or processing necessary on-board the satellite(s). Such an internal routing technique may reduce the amount of memory required on-board the satellite(s) at the expense of using additional address space in communicated data packets.

For example, an ATM-compatible (or partially-ATM-compatible) satellite communication network may require the use of some of the address space available in an ATM header for data packet routing. Such a data packet routing technique may be compatible with ATM VC switching in which the VPI and VCI fields of the ATM header may be dynamically modified. A problem may exist, however, when an external network wants to route ATM data packets through the intermediate satellite communication network using VP switching, which does not allow the VCI field in the ATM header to be dynamically modified. Since the intermediate network may need to use the address space in the VCI field to perform custom internal routing, the intermediate network may not be able to route ATM data packets using standard VP switching.

One solution to this problem is to notify external networks and data routers that the intermediate network is not capable of handling particular types of data packets or data packets being routed with a particular type of routing. However, for an intermediate network provider that is in the business of selling communication bandwidth, this solution involves turning away business, which is unacceptable.

Another solution to this problem is to use variable-length data packets in the intermediate network. However, this solution may not be acceptable for intermediate networks designed to be compatible with fixed-length packet formats. This solution may also lead to an unacceptable amount of wasted bandwidth caused by communicating unnecessary information.

Thus, a need has long existed for a method and apparatus for routing fixed-length data packets through an intermediate network that uses internal routing incompatible with the external network. A need has also long existed for a method and apparatus for routing fixed-length data packets from an external network through an intermediate network that requires more dynamically modifiable address space than allowed by the fixed-length data packet format and the routing technique chosen by the external network.

SUMMARY OF THE INVENTION

A preferred embodiment of the present invention provides a method and apparatus for communicating fixed-length data packets through an intermediate computer network. The method comprises receiving an original data packet characterized by a fixed-length packet format defining an address field for carrying original data packet routing information and a data field for carrying original data information. The method comprises constructing an intermediate (or "remnant") packet characterized by the fixed-length packet format, which includes inserting at least a portion of the data packet routing information from the address field of the original data packet in the data field of the remnant packet. The method also comprises communicating the remnant packet between nodes in the intermediate network. The method further comprises receiving the remnant packet and constructing a reconstructed data packet characterized by the fixed-length packet format. Constructing the reconstructed packet includes inserting the original data packet routing information, which was communicated in the data field of the remnant packet, in the address field of the reconstructed data packet.

The apparatus comprises a communication network node that comprises a receiver, transmitter, computer memory and a processor. The receiver receives original data packets characterized by the fixed-length packet format. The processor receives an original data packet from the receiver and constructs an intermediate (or "remnant") packet characterized by the fixed-length packet format, in which the data field includes routing information from the address field of the original data packet. The data field of the remnant packet includes at least a portion of data information from the data field of the original data packet and may include information from a previously received original data packet. The processor sends the remnant packet through the intermediate network via the transmitter. The apparatus also comprises a second communication network node that comprises a receiver, transmitter, computer memory and processor. The receiver receives the remnant packet, and the processor constructs a reconstructed data packet characterized by the fixed-length packet format, where the address field of the reconstructed data packet includes original data packet routing information that was carried in the data field of the remnant packet. The data field of the reconstructed data packet includes data information from the remnant packet, and may also include stored information from the computer memory corresponding to a previously received remnant packet.

DETAILED DESCRIPTION OF THE PREFERRED EMBODIMENT

Figure 1:
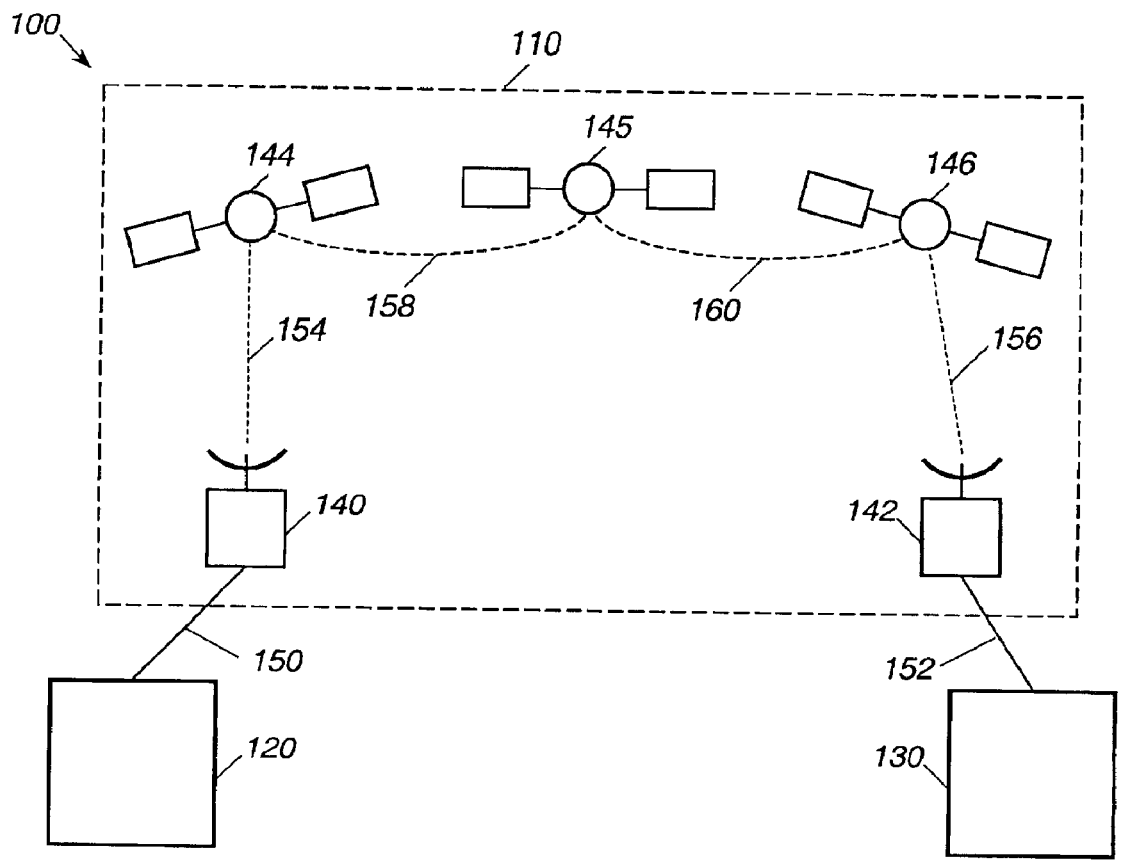
FIG. 1 shows a communication network including an intermediate satellite communication network.

FIG. 1 shows a communication network 100 including an intermediate communication network 110. The communication network 100 also includes a first external node 120 and a second external node 130. The intermediate communication network 110 is a satellite communication network that comprises a first internal node 140, a second internal node 142, and three satellites 144–146. A first communication link 150 links the first external node 120 to the first internal node 140, and a second communication link 152 links the second external node 130 to the second internal node 142. A first satellite communication link 154 links the first internal node 140 to the first satellite 144, and a second satellite communication link 156 links the second external node 130 to the third satellite 146. A first inter-satellite communication link 158 links the first satellite 144 to the second satellite 145, and a second inter-satellite communication link 160 links the second satellite 145 to the third satellite 146.

In operation, the first external node 120 may, for example, send an original data packet to the second external node 130 through the intermediate communication network 110. The first external node 120 may send the data packet to the first internal node 140 over the first communication link 150. If the data packet format and routing is compatible with the data packet format and routing used by the intermediate communication network 110, then the original data packet may readily travel from the first internal node 140, through the satellites 144–146, through the second internal node 142, and to the second external node 130. For example, if the data packet is an Asynchronous Transfer Mode (ATM) data packet (or "cell") being routed using ATM Virtual Channel (VC) switching, and if the intermediate communication network 110 is compatible with ATM (in particular, ATM cells being routed using VC switching), then the data packet will readily traverse the intermediate communication network 110, However, if the original data packet format or routing is not compatible with the data packet format or routing used by the intermediate communication network 110, then the original data packet may require additional processing to be routed to the second external node 130. For example, if the original data packet is an ATM cell being routed from the first external node 120 to the second external node 130 using ATM Virtual Path (VP) switching, and the intermediate communication network 110 is compatible with the ATM data packet format and VC switching, but not ATM VP switching, then the ATM cell may require additional packet processing to be routed to the second external node 130. Such a routing conflict may arise, for example, in a satellite communication network that makes a tradeoff between routing flexibility and a reduction in satellite hardware. In such an intermediate communication network 110, a method and/or apparatus enabling ATM cells routed with either VC or VP switching to be routed through the intermediate communication network 110 would increase the flexibility, and thus the potential customer base, of the intermediate communication network 110.

Figure 2:
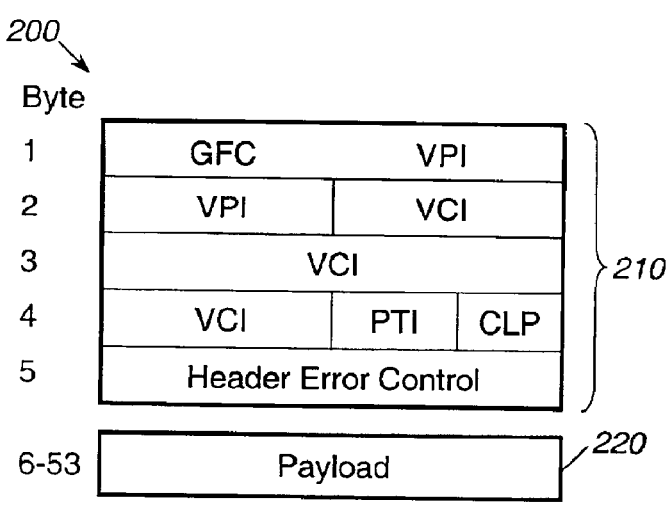
FIG. 2 illustrates a fixed-length data packet format.

FIG. 2 shows the fixed-length packet format 200 for an ATM cell. The fixed-length packet format 200 includes an address field 210 and a data field 220. The address field 210 includes address space for packet routing information, and the data field 220 includes data space for packet data information. For an ATM cell, the address field 210 includes generic flow control (GFC), virtual path identifier (VPI), virtual channel identifier (VCI), payload type indicator (PTI), cell loss priority (CLP), and header error control (HEC) fields. For an ATM cell routed using ATM VC switching, both the VCI and VPI fields may be dynamically modified as the ATM cell traverses a network. However, for an ATM cell routed using ATM VP switching, the VPI field may be dynamically modified while the VCI field remains constant. Thus, an ATM cell routed using VP switching has less dynamically modifiable address space than an ATM cell routed using VC switching.

Figure 3:
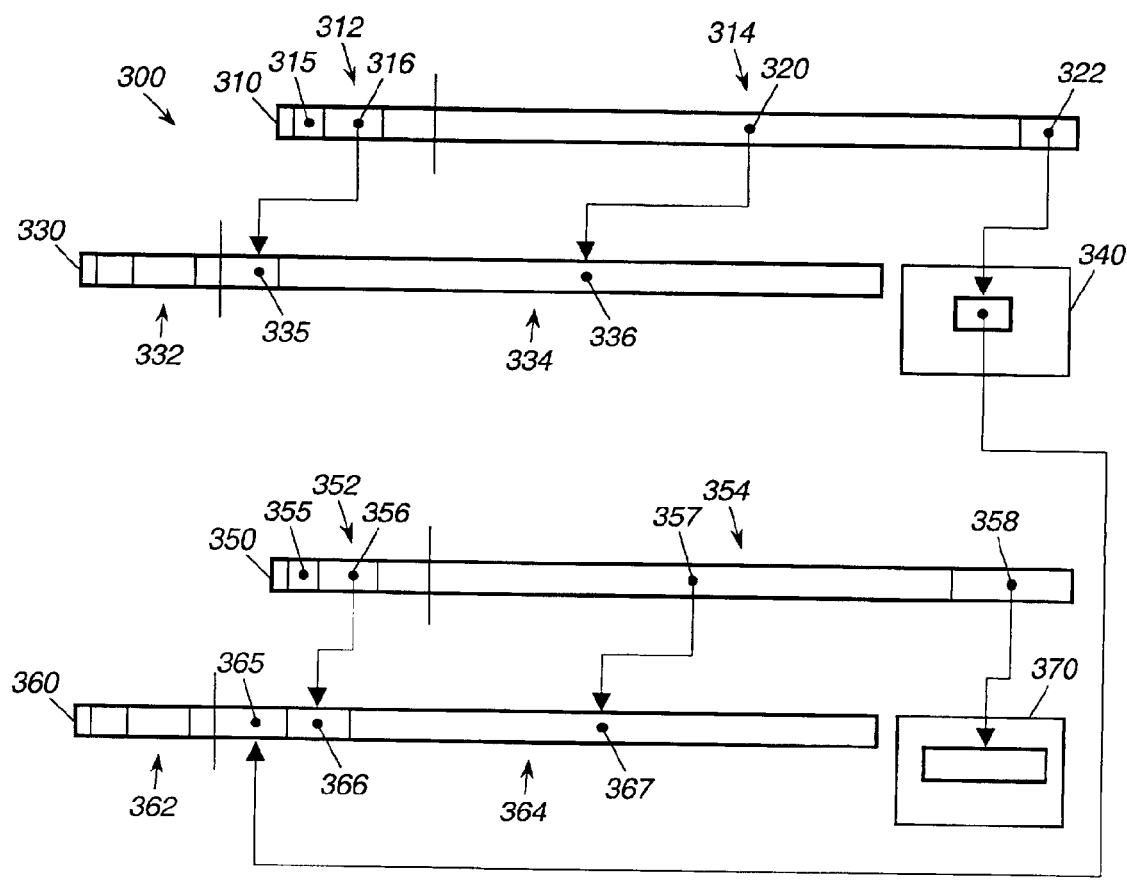
FIG. 3 illustrates constructing a remnant data packet.

As described below, a method and apparatus for routing fixed-length data packets, such as, for example, ATM cells, through an intermediate network that uses internal routing incompatible with the external network using remnant packets is provided. FIG. 3 shows a bracket diagram 300 that illustrates construction of remnant packets. A first original data packet 310 is characterized by a fixed-length packet format (for example, ATM). The first original data packet 310 includes an address field 312 that carries first packet routing information and a data field 314 that carries first packet data information. According to the ATM packet format, the address field 312 includes a VPI field 315 and a VCI field 316.

If the first data packet 310 is being routed using a type of packet routing (or "switching") that requires at least a portion of the first packet routing information in the address field 312 to be preserved, the amount of address space in the address field 312 that may be dynamically modified as the first original data packet 310 traverses the intermediate communication network 110 is reduced. If the intermediate communication network 110 requires the use of more dynamically modifiable address space in the address field 312 than the type of packet routing chosen by the external network allows, then the intermediate communication network 110 may relocate the portion of the first packet routing information to be preserved to provide more dynamically modifiable address space in the address field 312. For example, an external network routing an ATM cell using VP routing (requiring the information in the VCI field 316 to be preserved), and the intermediate communication network 110 requires the use of at least some of the address space in the VCI field 316, then the intermediate communication network 110 may temporarily relocate at least a portion of the information in the VCI field 316.

To that end, a first intermediate (or "remnant") packet 330 characterized by the fixed-length packet format (for example, ATM) is constructed. The first remnant packet 330 includes an address field 332 that carries remnant packet routing information and a data field 334 that carries remnant packet data information. The address field 332 and data field 334 of the first remnant packet 330 are the same size as the address field 312 and data field 314 of the first original data packet 310. At least a portion of the information in the VCI field 316 of the first original data packet 310 is inserted at a first location 335 in the data field 334 of the first remnant packet 330.

Next, a first portion 320 of information in the data field 314 of the first data packet 310 is inserted at a second location 336 in the data field 334 of the first remnant packet 330. Since the VCI information inserted in the data field 334 of the first remnant packet 330 reduces the amount of space available in the data field 334, all of the information in the data field 314 of the first original data packet 310 will not fit in the data field 334 of the first remnant packet 330. Accordingly, a second portion 322 of information in the data field 314 of the first original data packet 310 may be saved in 110 storage 340 (for example in memory for a subsequent remnant packet).

A second original data packet 350 arrives that is characterized by the fixed-length packet format (for example, ATM). The second original data packet 350 includes an address field 352 that carries second packet routing information and a data field 354 that carries second packet data information. According to the ATM packet format, the address field 352 includes a VPI field 355 and a VCI field 356.

A second remnant packet 360 characterized by the fixed-length packet format (for example, ATM) is constructed. The second remnant packet 360 includes an address field 362 that carries remnant packet routing information and a data field 364 that carries remnant packet data information. The address field 362 and data field 364 of the second remnant packet 360 are the same size as the address field 352 and data field 354 of the second original data packet 350.

The second portion 322 of the information from the data field 314 of the first data packet 310 is retrieved from storage 340 and inserted in a first location 365 in the data field 364 of the second remnant packet 360. Alternatively, and as mentioned previously, the second portion 322 may have already been previously stored at the first location 365 of a shell for a subsequent remnant packet. The information in the VCI field 356 of the second original data packet 350 is inserted at a second location 366 in the data field 364 of the second remnant packet 360.

Alternatively the information in the VCI field 356 of the second original data packet 350 could be inserted at location 365 with the prior remnant 340 inserted at location 366. Next, a first portion 357 of information in the data field 354 of the second original data packet 350 is inserted at a third location 367 in the data field 364 of the second remnant packet 360. Since the VCI information from the second original data packet 350 and the second portion 322 of the data information from the first original data packet 310 inserted in the data field 364 of the second remnant packet 360 reduce the amount of space available in the data field 364, all of the information in the data field 354 of the second original data packet 350 will not fit in the data field 364 of the second remnant packet 360. Accordingly, a second portion 358 of information in the data field 354 of the second original data packet 350 is inserted in storage 370 (perhaps as a portion of a shell for a subsequent remnant packet in memory).

The first original data packet 310 is preferably associated with the second original data packet 350. For example, the original data packets 310, 350 may belong to a packet stream corresponding to a message. As additional data packets arrive and additional remnant packets are formed, the amount of data in storage 340, 370 increases. When the amount of data in storage 340, 370 increases to an amount large enough to fill the data space in a remnant packet, a remnant packet may be formed to transport at least a portion of the stored data. In addition, when the last original data packet in a packet stream arrives, a last remnant packet may be formed to carry the last data.

Figure 4:
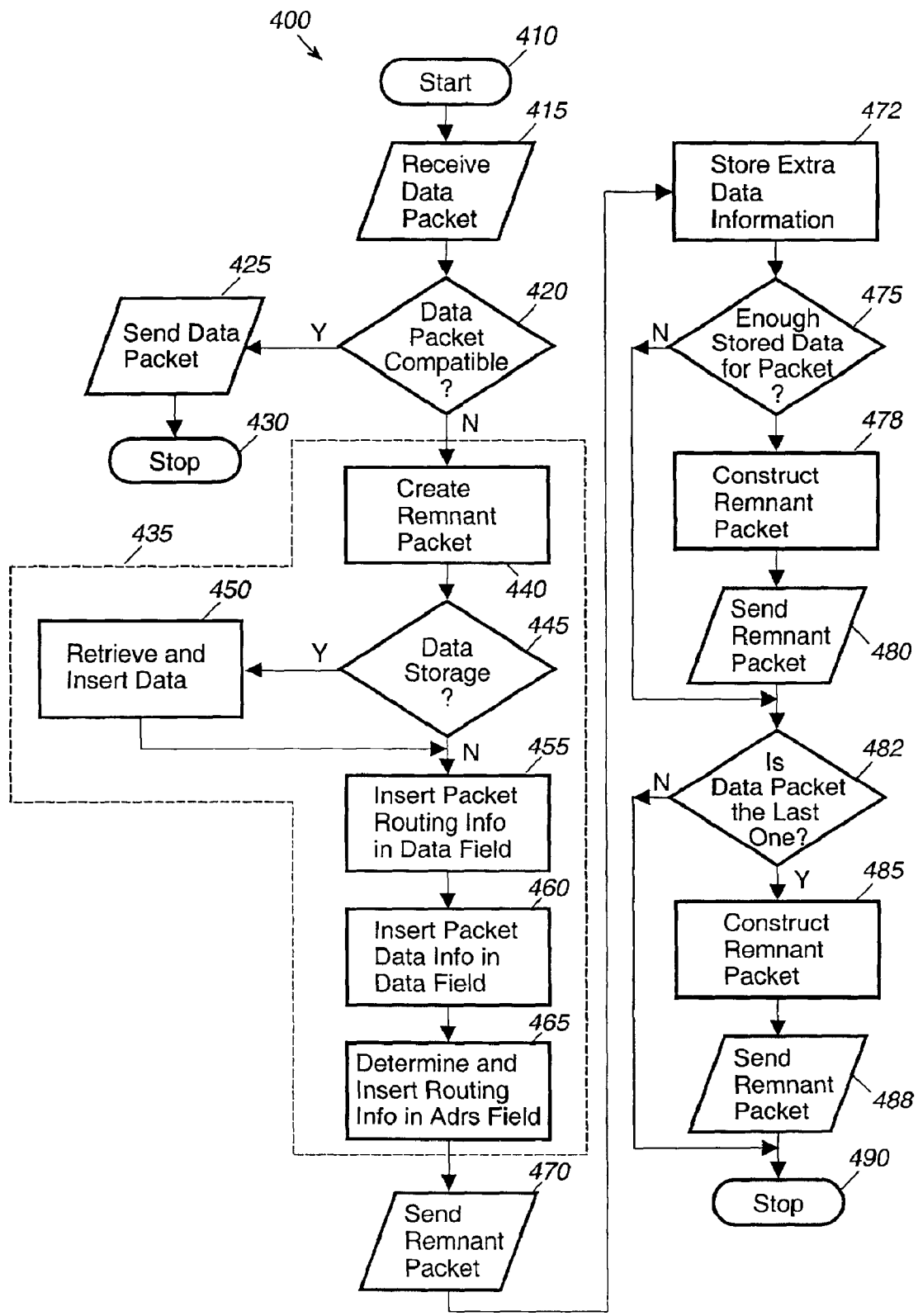
FIG. 4 shows a method for sending a data packet.

FIG. 4 shows a corresponding method 400 for sending a data packet. The method 400 starts 410 when an original data packet arrives. The method 400 receives 415 the original data packet, which is characterized by a fixed-length packet format, such as, for example, the ATM packet format. The original data packet preferably includes an address field carrying packet routing information and a data field carrying packet data information.

The method 400 then determines 420 if the received original data packet is compatible with the intermediate communication network. In other words, the method 400 determines 420 if the original data packet may be routed through the intermediate communication network using the standard packet routing of the intermediate communication network or if the original data packet must be routed using an alternative processing or routing method. For example, if the data packet is an ATM cell being routed using VC switching, and the intermediate communication network is compatible with ATM VC switching, the method 400 will determine 420 that the original data packet is compatible with the intermediate communication network, and then send on the original data packet. On the other hand, if the original data packet is an ATM cell being routed using VP routing, and the intermediate communication network is capable of ATM VC routing but not ATM VP routing, the method 400 will determine 420 that the original data packet is incompatible with the intermediate communication network, and hence in need of additional processing. Such an intermediate communication network may, for example, require the availability of more dynamically modifiable address space than ATM VP routing provides.

If the method 400 determines 420 the original data packet to be compatible with the intermediate communication network, the method 400 sends 425 the original data packet through the network using the standard routing used for the intermediate communication network. The method 400 then waits 430 for another original data packet to arrive.

If the method 400 determines 420 the original data packet to be incompatible with the intermediate communication network, for example due to the availability of too little dynamically modifiable address space, the method constructs 435 an intermediate packet (or "remnant packet") characterized by the fixed-length packet format.

Constructing 435 a remnant packet may comprise creating 440 a remnant packet shell (or data structure having fields corresponding to an ATM cell). Constructing 435 a remnant packet may include determining 445 if the original data packet corresponds to a previously received original data packet from which there is corresponding stored data. For example, the original data packet and a previously received original data packet may belong to the same data packet stream. If there is stored data corresponding to the original data packet, then the stored data is retrieved from storage and inserted 450 in the data field of the remnant packet.

In an alternate embodiment, the stored data may be stored in a subsequent remnant packet shell characterized by the fixed-length packet format, which then waits to be completed with data from a subsequently received original data packet before being sent. When a subsequently received original data packet arrives, including subsequent packet routing information contained in the address field, at least a portion of the subsequent packet routing information may be inserted in the data field of the subsequent remnant packet.

Constructing 435 a remnant packet includes inserting 455 at least a portion of the packet routing information from the original data packet in the data field of the remnant packet if the data field has adequate available space. Constructing 435 a remnant packet also includes inserting 460 at least a first portion of the packet data information from the original data packet in the data field of the remnant packet if the data field has adequate available space. Constructing 435 a remnant packet further includes determining 465 the appropriate routing information for the remnant packet and inserting the routing information in the address field of the remnant packet. At this point, the method 400 may also insert an indication of the remnant packet, preferably in the address field, that indicates (or "flags") the remnant packet is a remnant packet.

Once the method 400 constructs 435 the remnant packet, the method 400 sends 470 the remnant packet. If the original data packet contains a second portion of data information that did not fit in the remnant packet, the method 400 stores 472 the second portion so that the second portion of the data packet may be included in a subsequent remnant packet. Storing 472 the second portion may include storing the second portion in a shell in memory for a subsequent remnant packet.

The method 400 determines 475 if the amount of information stored for a particular data packet stream is enough to fill a remnant packet. If the amount of information stored for a particular data packet stream is enough to fill a remnant packet, the method 400 constructs 478 a remnant packet according to the fixed-length packet format, including filling the data field of the remnant packet with at least a portion of the stored information. The method 400 then sends 480 the remnant packet. Alternatively, the stored information may already be stored in a subsequent remnant shell, which the method 400 then sends 480.

The method 400 determines 482 if the original data packet was the last data packet for a particular data packet stream. If the data packet was the last data packet for a particular data packet stream, the method 400 constructs 485 a remnant packet, including the remainder of any stored information corresponding to the particular data packet stream, and sends 488 the remnant packet. The method 400 then waits 490 for a next original data packet to arrive.

Figure 5:
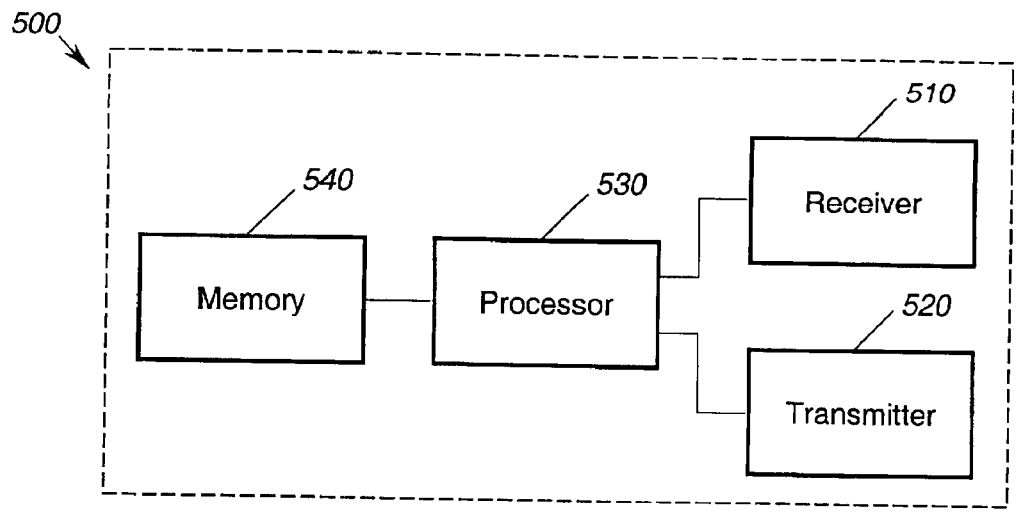
FIG. 5 illustrates a communication network node.

FIG. 5 illustrates a communication network node 500 for sending a data packet. The network node 500 includes a receiver 510, transmitter 520, processor 530 and computer memory 540. The processor 530 is coupled to the receiver 510, transmitter 520 and computer memory 540.

The receiver 510 receives an original data packet characterized by a fixed-length packet format defining an address field and a data field. The receiver 510 then passes the original data packet to the processor 530, which receives the original data packet.

The processor 530 may analyze the original data packet to determine if the original data packet and its routing are compatible with the intermediate communication network of which the node 500 is a part. In other words, the processor 530 determines if the original data packet may be routed through the intermediate communication network using the standard packet routing of the network or if the original data packet must be routed using an alternative routing or processing method. For example, the processor 530 may determine if the original data packet has a sufficient amount of dynamically modifiable address space for subsequent routing through the intermediate communication network. If the processor 530 determines that the original data packet and its routing is compatible with the intermediate communication network, the processor 530 may then send the original data packet through the intermediate communication network using the standard routing used for the intermediate communication network.

If the processor 530 determines that the original data packet or its routing is not compatible with the intermediate communication network, the processor further processes the original data packet. For example, if the data packet is an ATM cell being routed using VP routing, and the intermediate communication network is compatible with ATM cells being routed using VC routing but not VP routing, the processor 530 determines that further processing is necessary. In response, the processor 530 constructs a remnant packet according to the fixed-length packet format, the data field of the remnant packet including information from the address field of the original data packet. For example, if the original data packet is an ATM packet, the data field of the remnant packet may include VCI information from the address field (or "header") of the original data packet.

The processor 530 determines if the original data packet is associated with a previously received original data packet. For example, the original data packet and a previously received original data packet may both belong to the same packet stream. The processor 530 may, for example, survey the computer memory 540 to determine if the computer memory 540 contains stored information that corresponds to the original data packet. If the processor 530 determines that the computer memory 540 contains stored information from a previously received original data packet that corresponds to the original data packet, the data field of the remnant packet formed by the processor 530 may include at least a portion of the stored information.

If the data field of the remnant packet is not completely filled with stored information from a previously received original data packet and with address information from the original data packet, then the data field of the remnant packet may also include at least a first portion of data information from the data field of the original data packet. If, after the data field of the remnant packet is completely populated with information, the data field of the original data packet contains a second portion of the data information that was not included in the data field of the remnant packet, then the processor 530 may store the second portion of the data information in the computer memory 540. For example, the processor 530 may store the second portion of the data information in a shell for a subsequent remnant packet.

The remnant packet may also include an indication that the remnant packet is a remnant packet. For example, if the remnant packet is an ATM (or pseudo-ATM) packet, a bit of the PTI field may be used as a flag to indicate that the packet is a remnant packet. Alternatively, particular VPI/VCI bit combinations may indicate that the packet is a remnant packet. The processor 530 then sends the remnant packet through the intermediate network via the transmitter 520.

Figure 6:
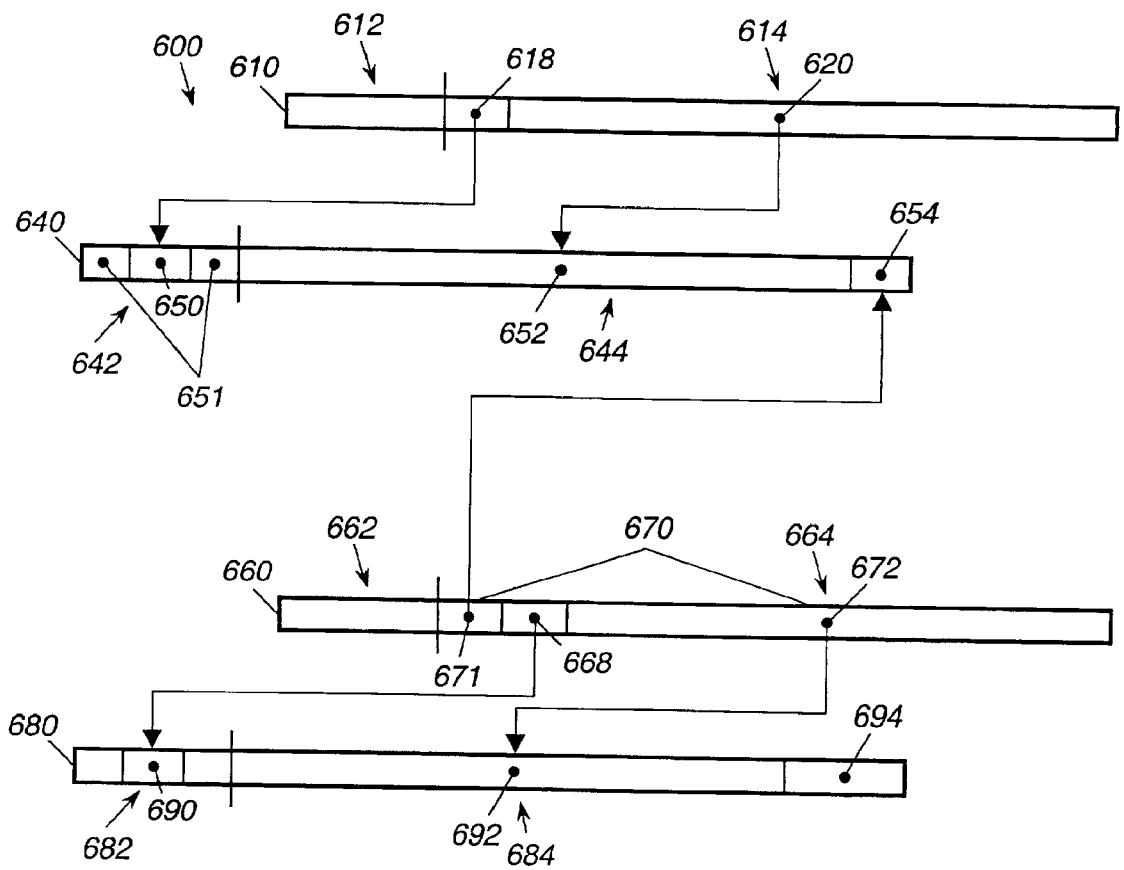
FIG. 6 illustrates constructing a reconstructed data packet.

Turning next to FIG. 6, that figure shows a packet diagram 600 that illustrates constructing a reconstructed data packet from remnant packets. A first remnant packet 610 is characterized by a fixed-length packet format (e.g., ATM). The first remnant packet 610 includes an address field 612 that carries first remnant routing information and a data field 614 that carries first remnant data information. To reconstruct the data packet corresponding to one or more remnant packets, a reconstructed data packet 640 is formed which is characterized by the fixed-length packet format.

If the first remnant packet 610 was formed using a method similar to the method 400 illustrated in FIG. 4, the data field 614 of the first remnant packet 610 includes original data packet routing information 618 and original data packet data information 620. The original data packet routing information 618 is extracted from the data field 614 of the first remnant packet 610 and inserted in the address field 642 of the reconstructed data packet 640, preferably in the position 650 from which the original data packet routing information 618 was extracted from the original data packet. The original data packet data information 620 is extracted from the data field 614 of the first remnant packet 610 and inserted at a first position 652 in the data field 644 of the reconstructed data packet.

Since the original data packet routing information 618 occupied space in the data field 614 of the first remnant packet 610, there is not enough original data packet data information 620 in the remainder of the data field 614 to fill the entire data field 644 of the reconstructed data packet 640. Thus, the data field 644 of the reconstructed data packet 640 includes temporarily vacant space 654. This temporarily vacant space 654 may be filled with null data, but is preferably filled with information from a subsequently received remnant packet 660 (or "second remnant packet 660") that corresponds to the first remnant packet 610.

The second remnant packet 660 is characterized by the fixed-length packet format and includes an address field 662 that carries second remnant routing information and a data field 664 that carries second remnant data information. To reconstruct the original data packet corresponding to one or more remnant packets, a second reconstructed data packet 680 is formed which is characterized by the fixed-length packet format.

If the second remnant packet 660 was formed using a method similar to the method 400 illustrated in FIG. 4, the data field 664 of the second remnant packet 660 includes original data packet routing information 668 and original data packet data information 670 from one or more corresponding original data packets. The original data packet data information 670 may include a first portion 671 and a second portion 672. The first portion 671 is extracted from the data field 664 of the second remnant packet 660 and inserted in the temporarily vacant space 654 of the reconstructed data packet 640. The reconstructed data packet 640 may then be completed by populating the remainder 651 of the address field 642.

The original data packet routing information 668 is extracted from the data field 664 of the second remnant packet 660 and inserted in the address field 682 of the second reconstructed data packet 680, preferably in the position 690 from which the original data packet routing information 618 was extracted from the corresponding original data packet. The second portion 672 of the original data packet data information 670 is extracted from the data field 664 of the second remnant packet 660 and inserted at a first location 692 in the data field 684 of the second reconstructed data packet 680.

Since the original data packet routing information 668 and the first portion 671 of the original data packet data information 670 occupied space in the data field 664 of the second remnant packet 660, there is not enough information in the second portion 672 of the original data packet data information 670 to fill the entire data field 684 of the second reconstructed data packet 680. Thus, the data field 684 of the second reconstructed data packet 680 includes temporarily vacant space 694. This temporarily vacant space 694 may be filled with null data, but is preferably filled with information from a subsequently received remnant packet that corresponds to the first and second remnant packets 610, 660.

Figure 7:
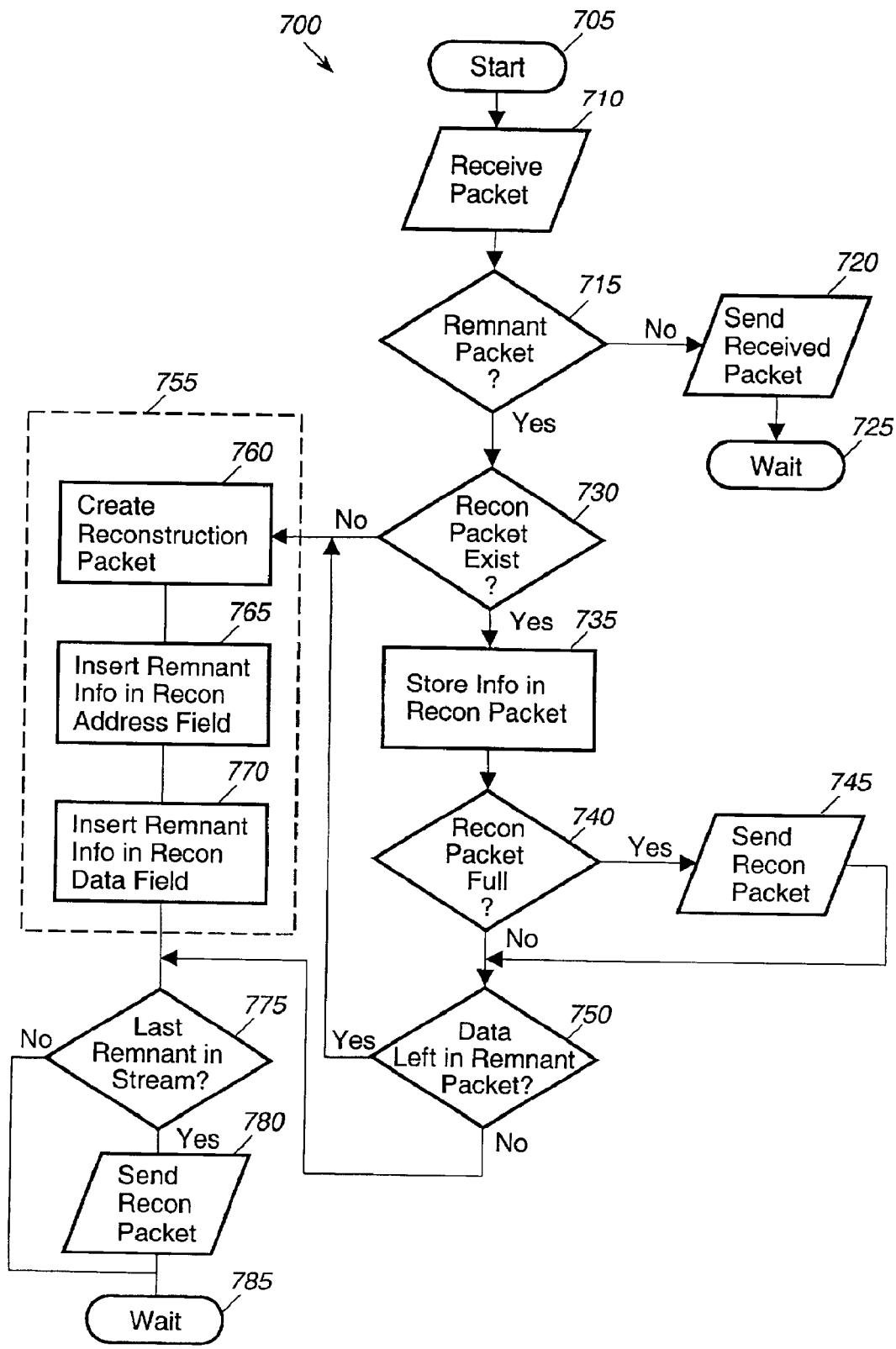
FIG. 7 shows a method for receiving a data packet.

FIG. 7 shows a method 700 for receiving a data packet according to a fixed-length packet format defining an address field and a data field. For example, the data packet may be an ATM cell. The method 700 begins 705 when a data packet, characterized by a fixed-length packet format arrives. The method 700 receives 710 the data packet and determines 715 if the data packet is a remnant packet, which carries remnant routing information in the address field and remnant data information in the data field. For example, the method 700 may determine 715 if the data packet is a remnant packet by analyzing a predetermined bit flag in the header of the data packet. If the received data packet is not a remnant packet, the method 700 sends 720 (or "routes") the data packet to its destination and waits 725 for the arrival of another data packet.

Information from a previously received remnant packet may exist in storage, preferably in the form of a partially filled reconstructed data packet. If the received packet is a remnant packet, the method 700 determines 730 if an existing reconstructed data packet corresponds to the remnant packet. For example, the method 700 may search through a database of reconstructed data packets to determine if an existing reconstructed data packet corresponds to the packet stream that the remnant packet belongs to. The method 700 may, for example, do this by comparing information in the address field of the remnant packet to information in the address field of a set of stored reconstructed data packets.

If the method 700 determines 730 that a reconstructed data packet exists that corresponds to the remnant packet, the method 700 inserts 735 information from the data field of the remnant packet in the data field of the reconstructed data packet. Thus, a data field of a reconstructed data packet may contain information from a remnant packet and at least one previously received remnant packet. The method 700 then determines 740 if the data space in the reconstructed data packet is full. If the data space in the reconstructed data packet is full, the method 700 sends 745 the reconstructed data packet to its destination. The method 700 then determines 750 if, after filling or attempting to fill the data space in the reconstructed data packet, the remnant packet still contains data information that has not been sent or stored in a reconstructed data packet.

If the method 700 determines 750 that the remnant packet still contains data, or determined 730 previously that a reconstructed data packet did not exist that corresponds to the remnant packet, then the method 700 constructs 755 a reconstructed data packet characterized by the fixed-length packet format (for example, the ATM packet format). Constructing 755 a reconstructed data packet may include creating 760 the data structure for the reconstructed data packet according to the fixed-length packet format. The method 700 then identifies 765 original data packet routing (or "address") information in the data field of the remnant packet and inserts that routing information in the address field of the reconstructed data packet, preferably at the same location in the reconstructed data packet that the routing information resided at in the original data packet. The method then identifies 770 original data packet data information that occupies the remainder of the data field of the remnant packet and inserts that data information in the data field of the reconstructed data packet.

At this point, the reconstructed data packet is generally not entirely populated, and thus will not be sent. However, the method 700 may send a partially empty reconstructed data packet if a remnant packet stream has been completed. Accordingly, the method 700 determines 775 if the remnant packet is the last packet in its packet stream. If the remnant packet is the last packet in its packet stream, the method 700 will send 780 the partially filled reconstructed data packet to its destination and wait 785 for the arrival of another data packet. Otherwise, the method 700 will retain the reconstructed data packet and wait 785 for the arrival of another data packet.

As an example, when a second remnant packet arrives, the method 700 will receive 710 the second remnant packet. The method 700 may insert 735 a first portion of information from the data field of the second remnant packet in the data field of the reconstructed data packet and send the reconstructed data packet to its destination. The method 700 may then construct 755 a second reconstructed data packet. The method 700 may then identify 765 second original data packet routing (or "address") information for a second original data packet in the data field of the second remnant packet and insert that routing information in the address field of the second reconstructed data packet, preferably at the same location in the second reconstructed data packet that the address information resided at in the second original data packet. The method 700 may then identify and insert 770 a second portion of data information for the second original data packet, that occupies the remainder of the data field of the second remnant packet, in the data field of the second reconstructed data packet.

The methods 400, 700 shown in FIGS. 4 and 7 respectively may be combined to form a method for communicating a data packet from a first node to a second node in a communication network.

Figure 8:
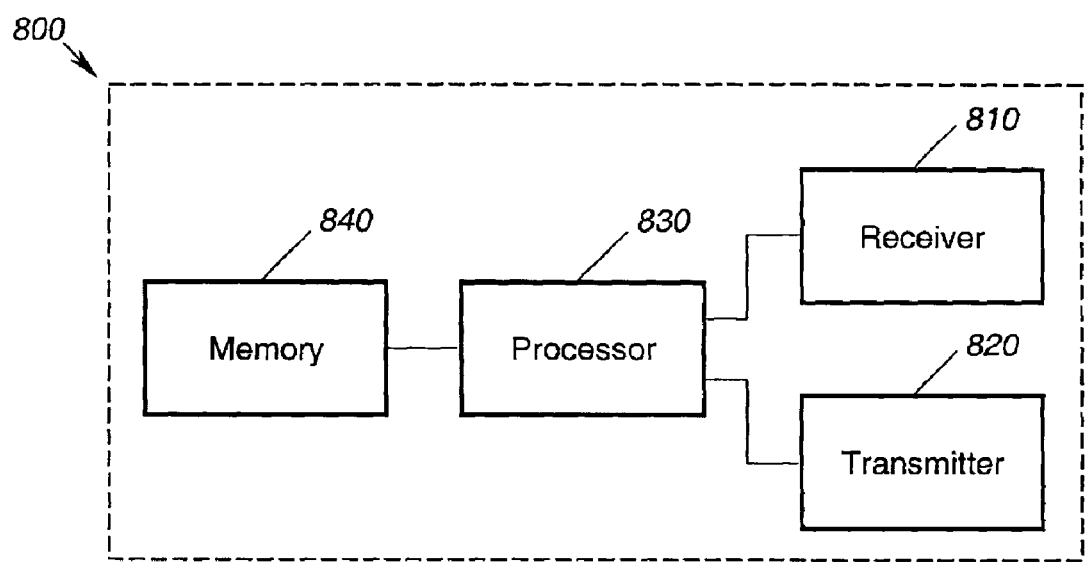
FIG. 8 illustrates a communication network node.

FIG. 8 illustrates a communication network node 800 for receiving a data packet. The network node 800 includes a receiver 810, transmitter 820, processor 830 and computer memory 840. The processor 830 is coupled to the receiver 810, transmitter 820 and computer memory 840.

The receiver 810 receives data packets characterized by a fixed-length packet format defining an address field and a data field. For example, the data packets may be ATM cells. The receiver passes a received data packet to the processor 830, which determines if the data packet is a remnant packet, which carries remnant routing (or "address") information in the address field and remnant data information in the data field. For example, the processor 830 may determine if the data packet is a remnant packet by analyzing a predetermined bit flag (such as a PTI bit in an ATM cell) in the header of the data packet.

If the received data packet is not a remnant packet, the processor 830 sends (or "routes") the data packet to its destination via the transmitter 820 and waits for the arrival of another data packet. Information from a previously received remnant packet may exist in storage in the computer memory 840, for example, in the form of a reconstructed data packet. If the received data packet is a remnant packet, the processor 830 determines if a reconstructed data packet exists in the computer memory 840 that corresponds to the remnant packet. For example, a reconstructed data packet may exist in the computer memory 840 that was created in response to a previously received remnant packet in the same packet stream as the remnant packet. The processor 830 may determine this, for example, by searching through a database of reconstructed data packets stored in the computer memory 840 and comparing information in the address field of the remnant packet to information in the address fields of the reconstructed data packets stored in the computer memory 840.

If the processor 830 determines that a reconstructed data packet is stored in the computer memory 840 that corresponds to the remnant packet, the processor 830 may include information from the data field of the remnant packet in the data field of the reconstructed data packet stored in the computer memory 840. Thus, a data field of a reconstructed data packet may contain information from a remnant packet and at least one previously received remnant packet.

The processor 830 may then determine if the stored reconstructed data packet is full, that is, has no more address space for additional information. If the stored reconstructed data packet is full, then the processor 830 may send the reconstructed data packet through the transmitter 820 to the packet destination. If, after filling or attempting to fill the data space in the reconstructed data packet, the processor 830 determines that the remnant packet still contains data that has not been sent or stored in a reconstructed data packet, the processor 830 may construct a reconstructed data packet characterized by the fixed-length packet format. This construction may, for example, include creating the data structure for the reconstructed data packet in the computer memory 840.

The reconstructed data packet includes an address field, which includes data packet routing (or "address") information for an original data packet that was carried in the data field of the remnant packet. Reconstructed data packet also includes a data field, which includes data packet data information for an original data packet that was carried in the data field of the remnant packet.

At this point, the reconstructed data packet is generally not entirely populated, so it will not be sent. However, the processor 830 may send a partially empty reconstructed data packet if a remnant packet stream has been completed. Accordingly, the processor 830 determines if the remnant packet is the last packet in its packet stream. If the remnant packet is the last packet in its packet stream, the processor 830 will preferably send the partially filled reconstructed data packet to its destination via the transmitter 820. Otherwise, the reconstructed data packet will remain in the computer memory 840 until a next corresponding remnant packet arrives at the node 800.

As an example, when a second remnant packet arrives, the receiver 810 will receive the second remnant packet. The receiver 810 may insert a first portion of information from the data field of the second remnant packet in the data field of the reconstructed data packet, thereby completing the reconstructed data packet. The processor 830 may then send the reconstructed data packet and construct a second reconstructed data packet characterized by the fixed-length packet format defining an address field and a data field. The address field of the second reconstructed data packet may include second data packet routing information for a second original data packet that was carried in the data field of the second remnant packet. The data field of the second reconstructed data packet may include a second portion of information from the data field of the second remnant packet. The second reconstructed data packet may then remain stored in the computer memory 840 until completed and sent by the processor 830 through the transmitter 820.

The preferred embodiments of the present invention provide a method and apparatus for routing fixed-length data packets through an intermediate network that uses internal routing incompatible with an external network. The embodiments provide a communication network with the capability to route, and thus market bandwidth for, information carrying data packets that the network may not otherwise be able to route.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for sending a data packet through an intermediate communication network that uses internal routing incompatible with the data packet, the method comprising:

receiving an original data packet characterized, by a fixed-length packet format defining an address field and a data field, the original data packet carrying original data packet routing information in the address field and original data packet information in the data field;

constructing a remnant packet characterized by the same fixed-length by the packet format as that of the original data packet, including a remnant packet data field and a remnant packet address field by inserting at least a original packet routing information in the remnant packet data field;

constructing a subsequence remnant packet characterized by the fixed-fixed packet format by inserting a second portion of the original data packet information in the data field of the subsequent remnant packet; and sending the remnant packet through the intermediate communication network, 2. The method of claim 1, wherein constructing a first remnant packet further comprises:

inserting a first portion of the original data packet data information in the remnant packet data field.

3. The method of claim 2, further comprising:

when the original data packet and a prior original data packet form part of a common message, inserting at least a portion of a prior original data packet data field in the remnant packet data field.

4. The method of claim 1, further comprising:

receiving a subsequent original data packet characterized by the fixed-length packet format, the subsequent original data packet subsequent original data packet routing information in the address field; and inserting at least a position of the subsequent of original packet routing information in the data field of the subsequent remnant packet.

5. The method of claim 1, wherein:

receiving an original data packet comprises receiving an original ATM cell including a VCI; and constructing a remnant packet further comprises inserting the VCI from the original ATM cell in the data field of the remnant packet.

6. The method of claim 1, further comprising:

when the address field of the original data packet includes sufficient available space for subsequent routing of the original data packet in the intermediate communication network, sending the original data packet without the remnant packet.

7. The method of claim 1, further comprising setting remnant packet flag in the remnant packet.

8. A method for receiving a data packet from an intermediate communication network, the method comprising:

receiving a current remnant packet characterized by a fixed-length packet format defining an address field and a data field, the current remnant packet carrying remnant routing information in the address field and remnant data information the data field; and building a reconstructed data packet characterized by the same fixed-length packet format as that of the received current remnant packet by identifying original data packet routing information contained in the data field of the current remnant packet;

inserting the original data packet routing information in the address field of the reconstructed data packet; and when the current remnant packet and a prior remnant packet form part of a common message, storing at least a portion of prior remnant packet data information in the data field of the reconstructed data packet.

9. The method of claim 8, wherein building a reconstructed data packet further comprises:

identifying original data packet data information contained in the data field of the current remnant packet; and inserting at least a first portion of the original data packet data information in the formation in the data field of the reconstructed data packet.

10. The method of claim 9, further comprising storing at least portion of original data packet data information from a prior remnant packet in the field of the reconstructed data packet.

11. The method of claim 8, wherein receiving a first remnant packet comprises:

receiving a data packet;

determining if the data packet is a remnant packet; and when the data packet is not a remnant packet, sending the data packet without building a reconstructed data packet.

12. The method of claim 8, wherein:

receiving a remnant packet comprises receiving a remnant ATM cell; and constructing a reconstructed data packet comprises:
constructing a reconstructed ATM cell;
retrieving a VCI from the data field of the remnant ATM cell; and
inserting the VCI in the VCI field of the reconstructed ATM cell.

13. A method for receiving a data packet comprising:

receiving a current remnant packet characterized by a fored-length packet format defining an address field and a data field, the current remnant packet carrying remnant routing information in the address field and remnant data information in the data field; and building a reconstructed data packet characterized by the fixed-length packet format by;

identifying original data packet routing information contained in the data field of the current remnant packet;

inserting the original data packet routing information in the address field of the reconstructed data packet; and when the current remnant packet and a prior remnant packet form part of a common message, storing at least a portion of prior remnant packet data information in the data field of the reconstructed data packet; and comparing the remnant routing information to stored packet routing information to determine when the prior remnant packet and the current remnant packet form part of the common message.

14. A method for receiving a data packet comprising:

receiving a current remnant packet characterized by a fixed-length packet format defining an address field and a data field, the current remnant packet carrying remnant routing information in the address field and remnant data information in the data field; and building a reconstructed data packet characterized by the fixed-length packet format by;
   identifying original data packet routing information contained in the data field of the current remnant packet;
   inserting the original data packet routing information in the address field of the reconstructed data packet;
   identifying original data packet data information contained in the data field of the current remnant packet;
   inserting at least a first portion of the original data packet information in the data field of the reconstructed data packet; and
   storing at least a portion of original data packet data information from a prior remnant packet in the data field of the reconstructed data packet;

receiving a subsequent remnant packet;

inserting a first portion of data information from the data of the subsequent remnant packet in the data field of the reconstructed data packet; and constructing a second reconstructed data packet according to the fixed-length packet format by:
   identifying subsequent original data packet routing information contained in the data field of the subsequent remnant packet;
   inserting the subsequent original data packet routing information in the address field of the second reconstructed data packet; and
   inserting at least a second portion of data information from the data field of the subsequent remnant packet in the data field of the second reconstructed data packet.

15. A communication network node for communicating data packets from an external communication network to an intermediate communication network that uses internal routing incompatible with external communication network, the communication network node comprising:

a receiver for receiving from the external communication network an original data packet characterized by a fixed-length packet format defining an original address field and an original data field a processor coupled to said receiver and operable to construct a remnant packet for transmission through the intermediate communication network using the same fixed-length packet format as that of the data packet, including a remnant address field and a remnant data field, by moving at least a portion of the original address field into the remnant data field; and means for constructing a subsequence remnant packet characterized by fixed-fixed packet format by inserting a second portion of the original data packet information in the data field of subsequent remnant packet.

16. The communication network of claim 15, wherein said fixed-length pocket format is ATM, and the remnant data field comprises at least a portion of a VCI from the original data packet.

17. The communication network node of claim 15, wherein the processor is operable to send the original data packet without first constructing a remnant packet when the original address field includes sufficient available space for subsequent routing in the intermediate communication network.

18. The communication network node a claim 15, wherein the remnant packet comprises a remnant packet flag.

19. A communication network node for communicating data packets to an external communication network from an intermediate communication network that uses internal routing incompatible with external communication network, the communication network node comprising:

a receiver for receiving a remnant packet after transmission through the intermediate communication network using a fixed-length packet format defining a remnant address field and a remnant data field the remnant address field comprising remnant packet routing information and the remnant data field comprising original data packet routing information arid original data packet data information; and a processor operable to form a reconstructed data packet characterized by the same fixed-length packet format as that of the remnant packet; including a reconstructed address field and a reconstructed data field, the reconstructed address field comprising original packet routing information from the remnant data field.

20. The communication network node of claim 19, wherein the reconstructed data field comprises at least a portion of the original data packet data information.

21. The communication network node of claim 19, wherein the processor is further operable to insert stored data information from a prior associated remnant packet in the reconstructed data field.

22. The communication network node of claim 19, wherein said receiver receives a subsequent remnant packet including a subsequent data field, and said processor forms subsequent reconstructed data packet according to the fixed-length packet format, including a subsequent reconstructed data field comprising original data packet data information from the remnant packet at least portion of the subsequent data field.

23. The communication network node of claim 19, wherein the processor is further operable to send the received data packet without constructing a reconstruction data packet when the received data packet is not a remnant packet.

24. The communication network node of claim 19, wherein said remnant packet is an ATM cell, and said reconstructed data packet is an ATM cell comprising a VCI field including VCI information from the remnant data field.

* * * * *